United States Patent
Domesle et al.

(10) Patent No.: US 8,866,330 B2
(45) Date of Patent: Oct. 21, 2014

(54) TOWER FOR A WIND TURBINE

(75) Inventors: Melanie Domesle, Rostock (DE); Sven Starke, Rostock (DE); Falk Frohberg, Leipzig (DE)

(73) Assignee: Suzlon Energy GmbH, Rostock (DE)

( * ) Notice: Subject to any disclaimer, the term of this patent is extended or adjusted under 35 U.S.C. 154(b) by 39 days.

(21) Appl. No.: 13/701,149

(22) PCT Filed: Jun. 3, 2011

(86) PCT No.: PCT/EP2011/059230
§ 371 (c)(1),
(2), (4) Date: Jan. 9, 2013

(87) PCT Pub. No.: WO2011/151465
PCT Pub. Date: Dec. 8, 2011

(65) Prior Publication Data
US 2013/0105199 A1    May 2, 2013

(30) Foreign Application Priority Data

Jun. 3, 2010  (DE) .......................... 10 2010 022 581

(51) Int. Cl.
*F03D 11/04* (2006.01)
*F03D 11/00* (2006.01)
*H01B 9/00* (2006.01)

(52) U.S. Cl.
CPC ............ *H01B 9/008* (2013.01); *F03D 11/0066* (2013.01); *F03D 11/00* (2013.01); *Y02E 10/728* (2013.01); *F03D 11/04* (2013.01)
USPC ............................................ 290/55; 174/100

(58) Field of Classification Search
CPC ............................... F03D 9/00; F03D 11/0066
USPC .......................................... 52/40; 290/44, 55
See application file for complete search history.

(56) References Cited

U.S. PATENT DOCUMENTS

| 6,713,891 B2 | 3/2004 | Kirkegaard et al. |
| 2002/0012582 A1 | 1/2002 | Kirkegaard et al. |

(Continued)

FOREIGN PATENT DOCUMENTS

| JP | 20041084518 A | 3/2004 |
| JP | 20061246549 A | 9/2006 |

(Continued)

OTHER PUBLICATIONS

International Search Report Dated Feb. 29, 2012, Mailed Mar. 8, 2012.
German Office Action Dated March 22, 2012.

*Primary Examiner* — Charles A. Fox
*Assistant Examiner* — Patrick Maestri
(74) *Attorney, Agent, or Firm* — Norris McLaughlin & Marcus, P.A.

(57) ABSTRACT

The invention relates to a tower for a wind turbine and to a cable guide therefor, wherein a nacelle for the wind turbine is arranged on the tower such that it can rotate by means of the azimuth bearing about a vertical axis which runs in the longitudinal direction of the tower. Current-conducting cables are routed in the tower of the wind turbine out of the nacelle from electrical components to the ground. The tower has at least two bundling devices which are suitable for joining the individual cables which run longitudinally in the tower together to form a cable bundle with the cables fixed with respect to one another. The bundling devices are attached to the cables between an upper and a lower area of the cable bundle. In this case, geometric configuration of the bundling device ensures that at least between three cables it is not below a specific minimum distance.

11 Claims, 9 Drawing Sheets

(56) References Cited

U.S. PATENT DOCUMENTS

Figure 1:
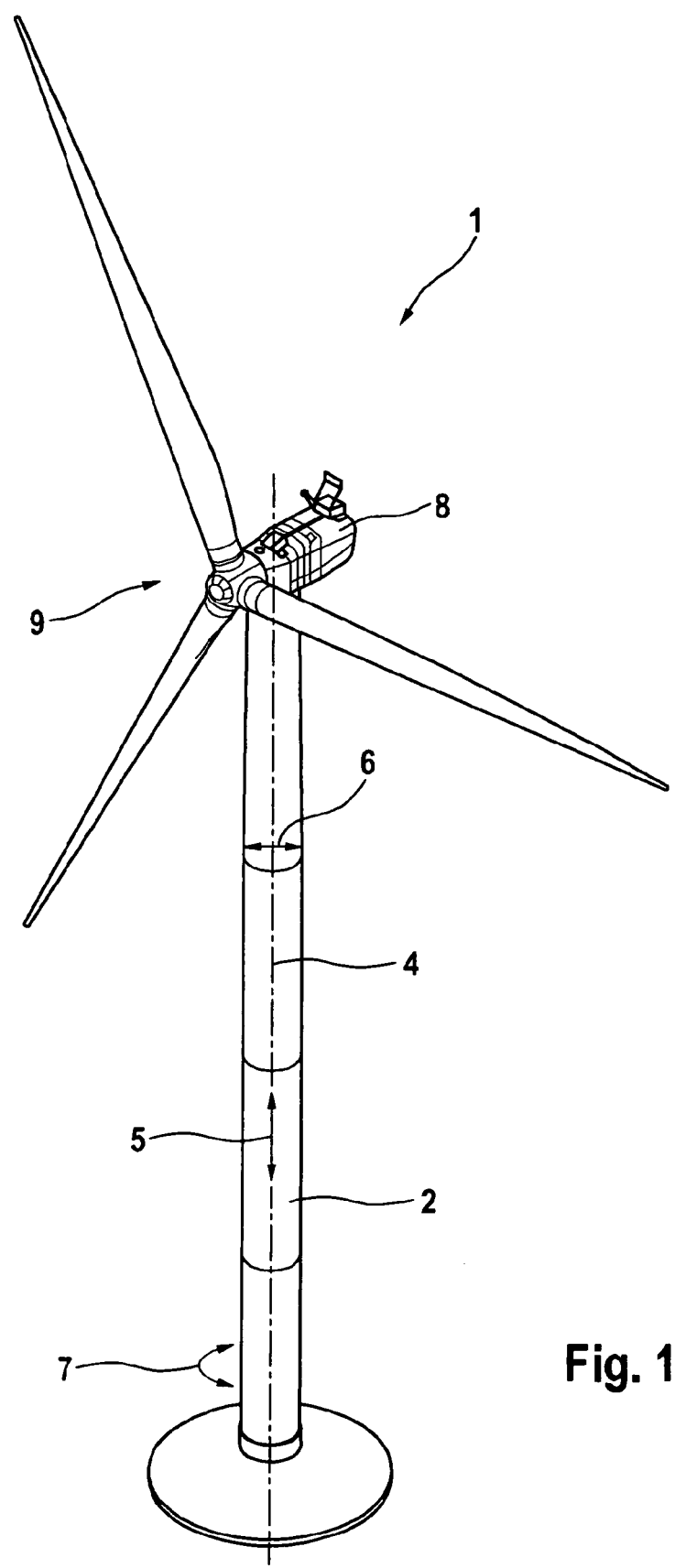

| | | |
|---|---|---|
| 2004/0094965 A1 | 5/2004 | Kirkegaard |
| 2009/0206610 A1 | 8/2009 | Martin |
| 2010/0247326 A1* | 9/2010 | Prebio .................. 416/244 R |

FOREIGN PATENT DOCUMENTS

| | | |
|---|---|---|
| JP | 2008/298051 A | 12/2008 |
| WO | 2007/094736 | 8/2007 |
| WO | 2010/108538 | 9/2010 |

* cited by examiner

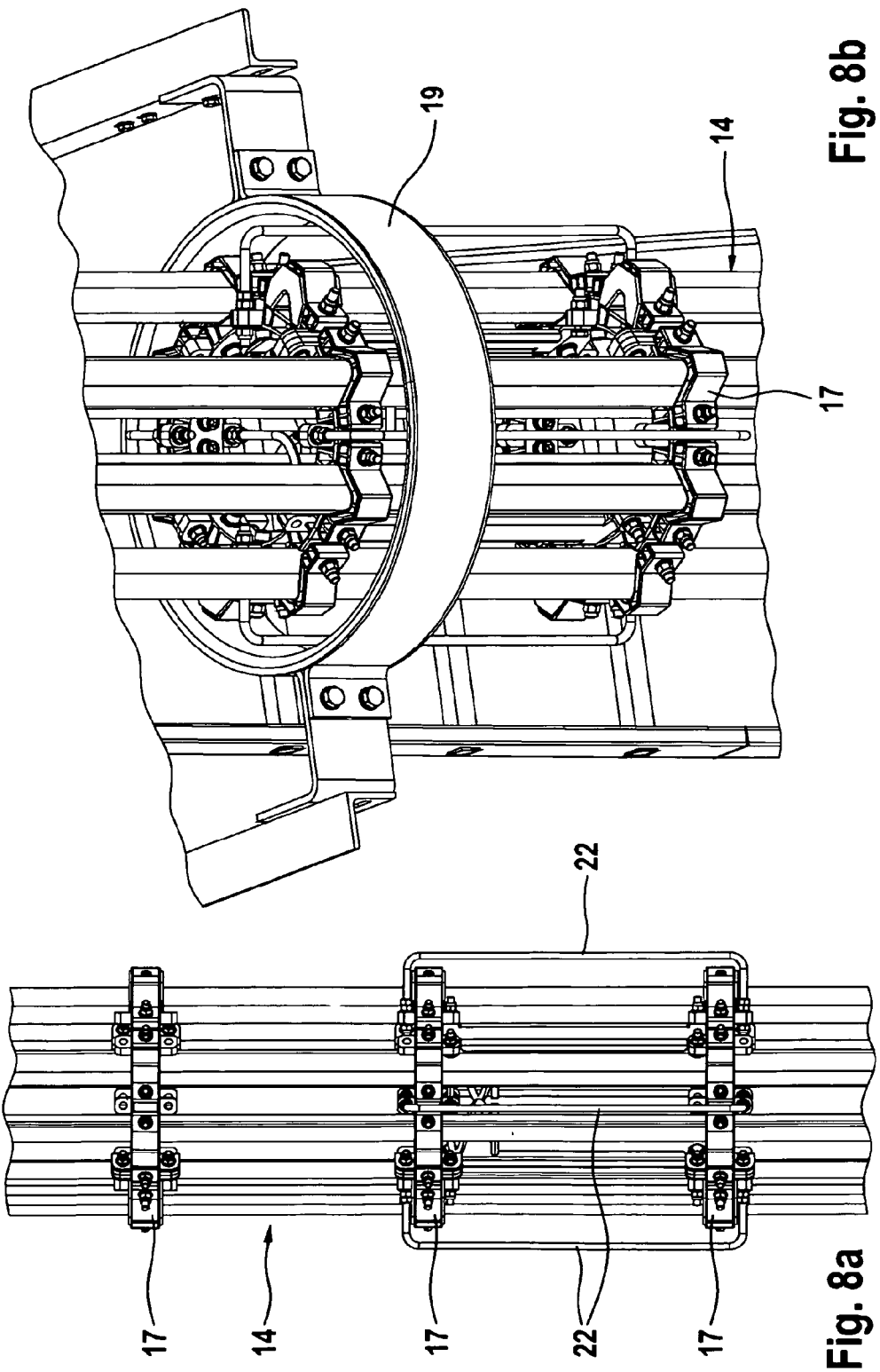

TOWER FOR A WIND TURBINE

This application is a 371 application of PCT/EP2011/059230 filed Jun. 3, 2011, which claims foreign priority benefit under 35 U.S.C. §119 of German application 10 2010 022 581.9 filed Jun. 3, 2010.

The invention relates to a tower for a wind turbine and to a cable guide for a tower of a wind turbine, wherein a nacelle for the wind turbine is arranged on the tower such that it can rotate about an axis which runs vertically in the longitudinal direction of the tower by means of the azimuth bearing. A generator for generating electrical energy which can be driven by a rotor of the wind turbine is provided in the nacelle. The azimuth bearing allows a horizontal orientation of the nacelle according to the wind direction, which is called 'wind tracking' of the wind turbine. For automatic alignment of the nacelle on the azimuth bearing one or more azimuth drives are provided, which are non-rotatably connected to the machine carrier of the nacelle. In this case the azimuth bearings must transmit the appearing bearing forces such as thrust, centrifugal and yaw forces, from the machine carrier of the nacelle into the tower.

During wind tracking—also described as 'yawing'—the nacelle is rotated around a vertical axis of rotation in the horizontal plane in order to rotate the rotor perpendicularly in the wind and consequently to maximize the energy output. Since the wind direction varies or even rotates it may be possible that the nacelle is rotated around its own axis several times.

The statements of axial direction, radial direction, circumferential direction used below and statements about the top and bottom are valid with respect to the tower axis of the erected tower of the wind turbine.

In the tower of the wind turbine, current-conducting cables, such as power cables, are routed from electrical components in the nacelle to the ground. These are a plurality of cables, for example a plurality of cables for electrical conduction of individual phases of alternating current, in particular three-phase alternating current, cables for earthing conductor and/or signal and control cables. The exact number of the cables—in particular the power cables—is dependent on the cross section of the individual electrical conductors and the nominal current to be transmitted. Usually the current conducting capacity of a single conductor of the power cable is too small to transmit the nominal current, and therefore the nominal current is divided to a plurality of power cables.

The cables are fixedly arranged in a lower portion of the tower preferably by means of cable terminals on the tower wall. In a middle part of the tower the cables are guided through a cable support into a radially central portion of the tower interior. From there the cables then extend centrally and freely suspended to an upper end of the tower and into the nacelle. To prevent the cables of excessive swinging it is known that the cables are led through a tube, preferably a polyethylene tube, and through a circular opening in the topmost platform of the tower. By guiding the cables through the tube, the cables will be collected in a large bundle. The bundling and mutual induction of closely packed current-conducting cables may result in a reduced current conducting capacity of the cables. Now if the nacelle rotates around its own axis several times because of wind tracking the cables will be twisted. This can result in damage or wear of the insulation due to friction between the individual cables, creating a major safety hazard. Moreover, the individual cables get closer to each other, thus the current conducting capacity of the cables is reduced. This has the result that the required number of cables for transmitting the nominal current increases and therefor the associated cost increase.

It is an object of the invention to provide an improved guidance of the cables which i.e. avoids the disadvantages of the prior art. In particular it is to be achieved that the current conducting capacity of the cables is secured and/or the wear between the cables is reduced.

The object is solved according to the invention with the features of claim 1, wherein the tower comprises at least two bundling devices suitable for combining the individual cables extending longitudinally in the tower together to a bundle of cablesixed with respect to each other. The bundling devices are mounted on the cables between an upper and a lower region of the cable bundle. Hereby it is ensured by geometric features of the bundling devices that a certain minimum distance is present between at least three cables in each state and it does not fall below the certain minimum distance to prevent a reduction in the current conducting capacity of different cables by mutual induction in accordance with IEC 60364-5-52. In each state is intended to mean that in each operating condition of the wind turbine and in each intended azimuth position of the nacelle, the cables are spaced at a minimum distance, and a mutual induction and reduction of the current conducting capacity is prevented.

According to a preferred embodiment, the bundling device is configured in such a manner that all the adjacent power cables are spaced at the minimum distance. In the case of a wind turbine with a doubly-fed asynchronous generator wherein the converter unit is arranged in the foot of the tower, this can be a plurality of power cables extending from the stator, it can preferably also be power cables extending from the generator rotor and/or earthing cables.

In the case that a multi-phase current, in particular three-phase current, is led through the cable, in particular through the power cable, each power cable comprises three individual conductors. These conductors may be combined together, since the magnetic fields of the respective phases of the current are substantially canceling each other out. Within the scope of this invention this multiphase cable with combined conductors is considered as a cable or as a current-conducting cable, especially a power cable. The individual conductors do not necessarily have to be surrounded by a common envelope, but can be. This applies for example when combining the three phases of a three-phase current in a cloverleaf structure.

According to a further embodiment, the bundling device is designed in such a manner that all the adjacent cables, such as power cables, earthing cables and control and signal cables, are spaced with the minimum distance.

In another embodiment, the bundling device comprises fastening devices for the arranging the cables. These can be arranged on the bundling device in such a way that the cables are arranged in a polygonal and equilateral structure. The structure can for example be in the shape of an equilateral triangle, a square, a regular pentagon, or a polygonal and equilateral shape with many corners. However, the number of corners and sides must be at least the same as the number of the cables, the power cables, or the current-conducting cables to be separated by means of the minimum distance. The fastening devices are arranged in such a manner that the distance between the cables mounted closest in the receptacles, is a minimum distance for preventing a reduction of the current conducting capacity of different cables by mutual induction according to IEC 60364-5-52. By keeping the minimum distance of the cables with respect to each other, the current conducting capacity of the cable is optimized, so that the number of cables required for transferring the nominal current can be reduced. This is particularly important in the cable routing of wind turbines since very high power is passed through the tower.

The polygonal and equilateral feature of the bundling device has the advantage that the distance of the individual cables with respect to each other is maximal when the overall size of the bundling device is minimal and consequently the electromagnetic interference of the cable with each other is minimized. The smallest possible diameter of the bundling device is most favorable with regard to the shortening of the cable bundle caused by twisting. The distance between the receptacles of the clamping clips therefore should be kept as short as possible, so that the excess of cables for compensating the shortening of the bundle can be kept as small as possible.

In a preferred embodiment the fastening devices are arranged in such a manner that the structure of the receptacles has an additional corner and side. The receptacle which is thereby additionally available, serves to accommodate the cable of the neutral conductor so that a minimum distance according to IEC 60364-5-52 is also available between the cable of the neutral conductor and the nearest current-conducting cables.

In a particularly preferred embodiment the fastening devices are arranged in such a manner that the structure of the receptacles has exactly the same number of corners and sides as the number of the existing cables. The receptacles, which are thereby additionally available, serves to accommodate signal lines so that a minimum distance according to IEC 60364-5-52 is also available between signal lines and the closest current-conducting cables or cables of the neutral conductor.

In one embodiment, the bundling device comprises a carrier on which the fastening devices are arranged to attach the cables to the bundling device. In this case, the fastening device has a receptacle for receiving the cables. The carrier may be formed in one piece or multi-piece and can for example have a ring-shaped, cross-shaped or star-like shape. It is also conceivable that the carrier is formed at least partially by the fastening devices or the fastening devices are formed at least partially by the carrier. Thereby several fastening devices could for example be assembled together so that this combined structure takes over the function of the carrier. The bundling device can be easily extended to the existing number of cables by attaching more clamping clips which saves money on installation and storage of spare parts for the bundling device.

The fastening devices are preferably configured as clamping clips which can be attached to the carrier by means of fastening elements. The fastening elements can e.g. be screws. In a first embodiment, the clamping clips are non-rotatably connected to the carrier and formed in one piece so that the clamping clips together with the carrier form the fastening device. The clamping clips are advantageously formed in an arc shape so that a receptacle for a cable or for a cable with a plurality of conductors is formed. The cable which is situated in the receptacle, is clamped between the clamping clip and the carrier when mounting the clamping clip onto the carrier, so that the bundling device is firmly connected to the cable.

In a preferred embodiment the clamping clip is formed as a V-shaped arc so that the receptacle has a triangular cross-section. This has the advantage that in a three-phase cable comprising three conductors the current-conducting cable is fixed by the clamping clip in the cloverleaf structure. In the case that cables with smaller diameters, for example signal cables, are available the receptacles may comprise an insert that reduces the size of the receptacle.

In one embodiment, each fastening devices is rotatably arranged on the carrier about an axis which substantially extends in radial direction. Through the rotatable arrangement of the fastening devices, the fastening devices can rotate with the twisting of the cable so that a normal axis to the triangular cross section of the receptacle of the fastening devices always extends parallel to a longitudinal axis of the cables. Thus, both the load on the cable as well as the load on the fastening devices and their connection elements can be reduced. The fastening device in this embodiment is configured in several pieces.

In ring-shaped carriers the bundling device has a radially inner circle-like unused cross-section. According to another embodiment, this cross-section can be used for the guidance of other cables, such as data, control, or signal cables. Favorably a further loose guide is attached to the carrier, for example in the form of a round steel bar bent to a helix, which is mounted in radial bores of the carrier.

An advantageous embodiment of the invention discloses that the lower region of the cable bundle is connected via a cable loop to the cable guide of the tower which is fixed to the tower. By the twisting of the cable the cable bundle is shortened in the axial direction. The cables are guided in the loop in order to make sure that a free rotation of the cables is not prevented by tightening of the cables and to prevent damage of the cables. The shortening of the cable bundle is compensated by the excess of cable in the loop.

Advantageously, the tower comprises a plurality of bundling devices which are fastened to the cables with regular distances between the upper and the lower region of the cable bundle. The distance between the bundling devices is selected in such a manner that a twisting of the cables is indeed allowed, but the cables still have the prescribed minimum distance with respect to each other even at a maximum rotation of the nacelle.

The cable bundles advantageously have an axial distance of 500 to 1000 mm with respect to each other, particularly advantageous the distances are between 500 and 600 mm. The cable bundle hangs for the most part freely in the tower of the wind turbine, and is non-rotatably connected to the nacelle only at the upper part and non-rotatably connected to a guide device at the lower region. The cable bundle is self-supporting and is stabilized by the bundling devices.

Due to movement of the tower and due to resonance, it can result in vibration of the cable bundle in the radial direction. In order to limit the radial movement of the cable bundle, in another embodiment, the tower includes at least one axially effective ring guide, which is fixedly connected to the tower. The cable bundle is guided through the ring guide and then hangs for the most part freely in the tower of the wind turbine. Conveniently, several ring guides are used, preferably two, particularly preferably three, and most preferably four ring guides.

The twisting of the cable bundle results in a shortening of the cable bundle, whereby the bundling devices, the lower ones greater than the upper ones, move in the direction of the nacelle. Through the axial displacement of the bundling devices, it is possible that the bundling device gets stuck axially in a guide ring. If the bundling devices get stuck, a further rotation of the nacelle is prevented and the cable bundle is intensely loaded, which under certain circumstances can lead to destruction of the cable bundle. To avoid this, at least one bundling device which is arranged in axial proximity to a ring guide and thus is threatened to get stuck, comprises a radial support. The radial support guides the bundling device through the rings throughout the entire axial movement of the cable bundle. To ensure this, the radial support must therefore have an axial length which is greater than the axial shortening of the cable bundle that is generated at the actual position.

In a further embodiment, the radial support can connect at least two successive bundling devices. In this embodiment, the axial length of the radial support must be greater than the axial shortening of the cable bundle which is generated in the actual section. Only in this way it can be ensured that the support is in contact with the ring guide during the entire axial movement of the cable bundle.

In particular, the distances between the bundling devices connected by the axial ring guide may be greater than the axial shortening of the cable bundle generated in the actual section. Thus, in this embodiment, the bundling devices may also be secured on the cables at irregular distances.

Since the radial support is connected to two bundling devices, which are arranged to be rotatable relative to each other according to the longitudinal axis of the cable bundle the radial support may be bent during a twisting of the cable bundle. In order to prevent this, the two bundling devices may in addition to the connecting radial support also be connected by a stiffener. Through this stiffener the two bundling devices which are connected with the radial support are non-rotatably connected to each other which prevents a twisting of the cable bundle in this area and a bending of the radial support.

Further details of the invention will become apparent from the description of the drawings.

Figure 2:
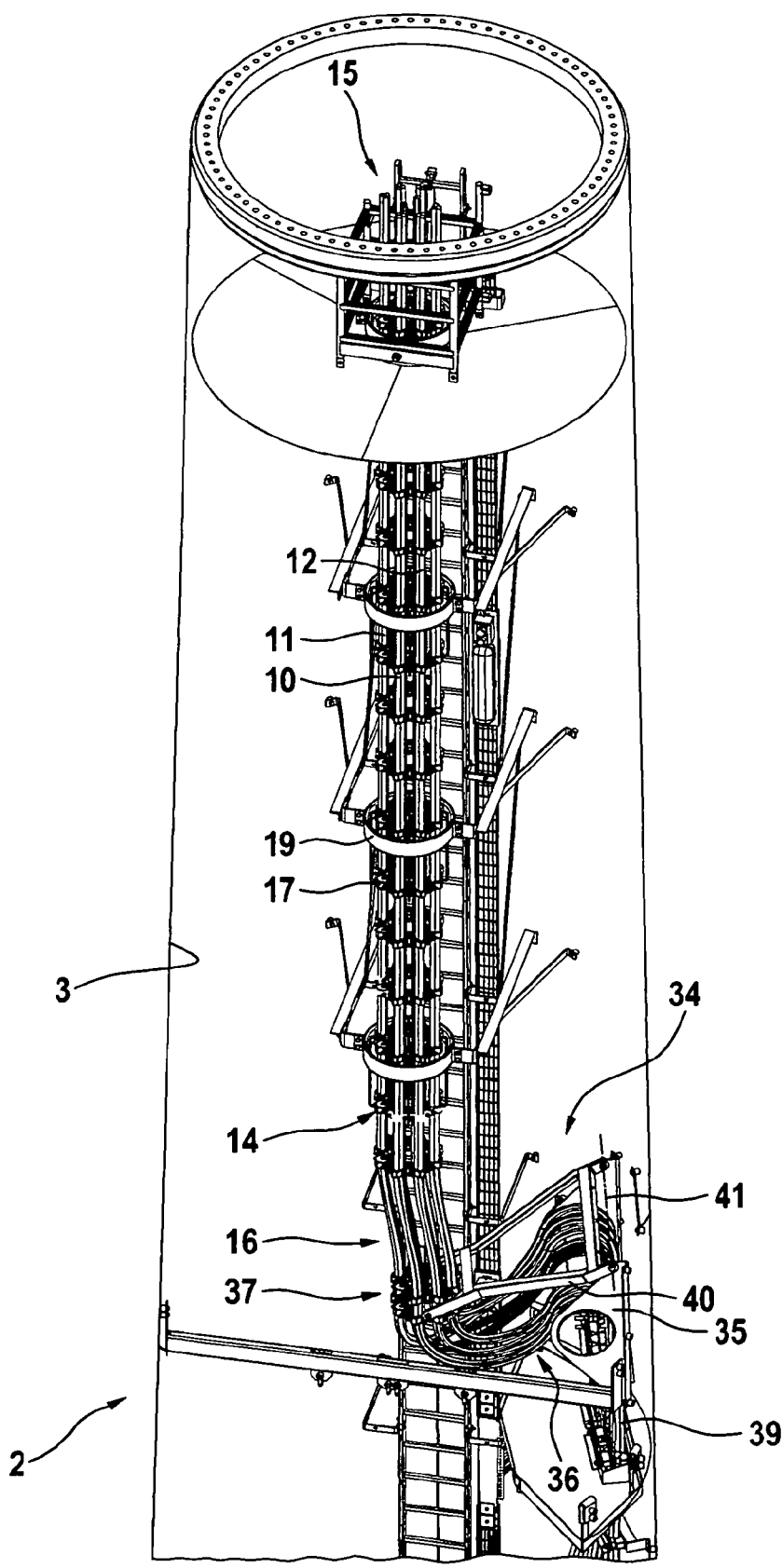
Figure 3A:
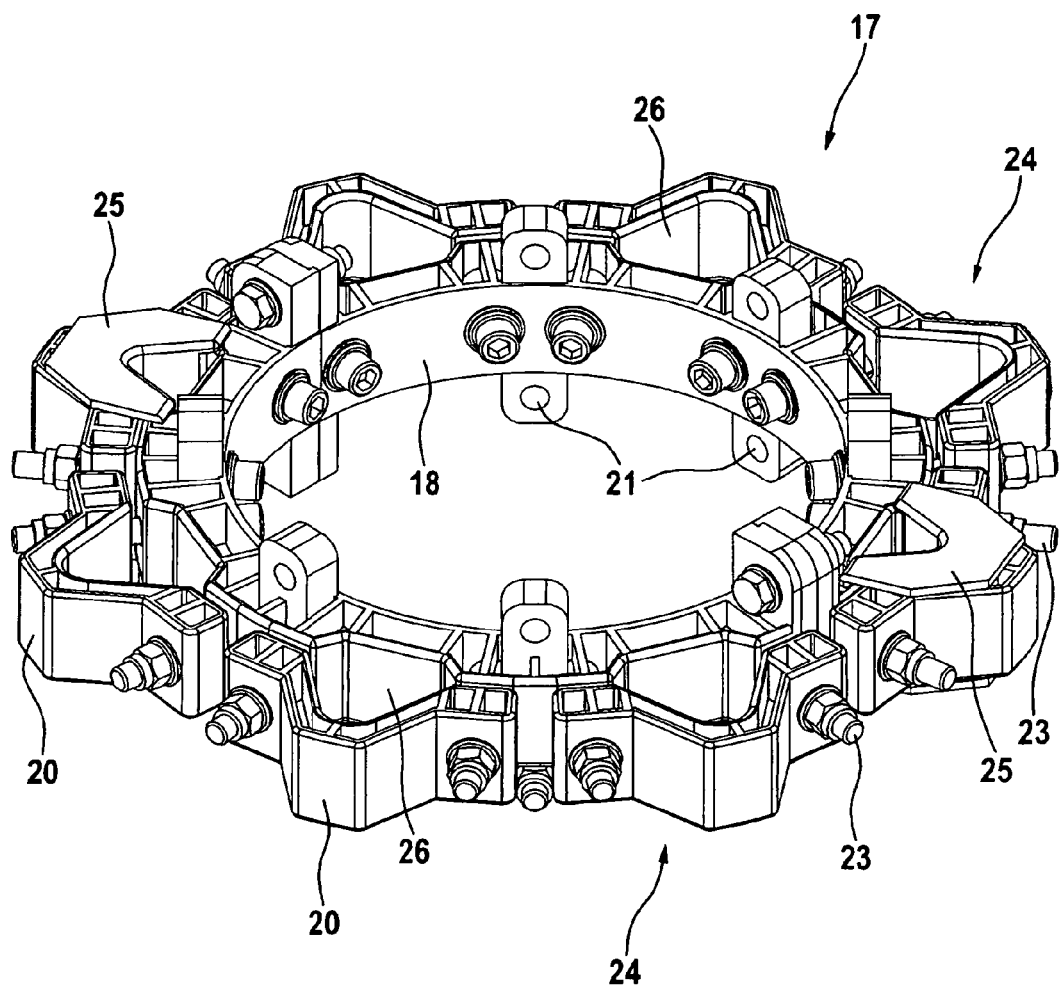
Figure 3B:
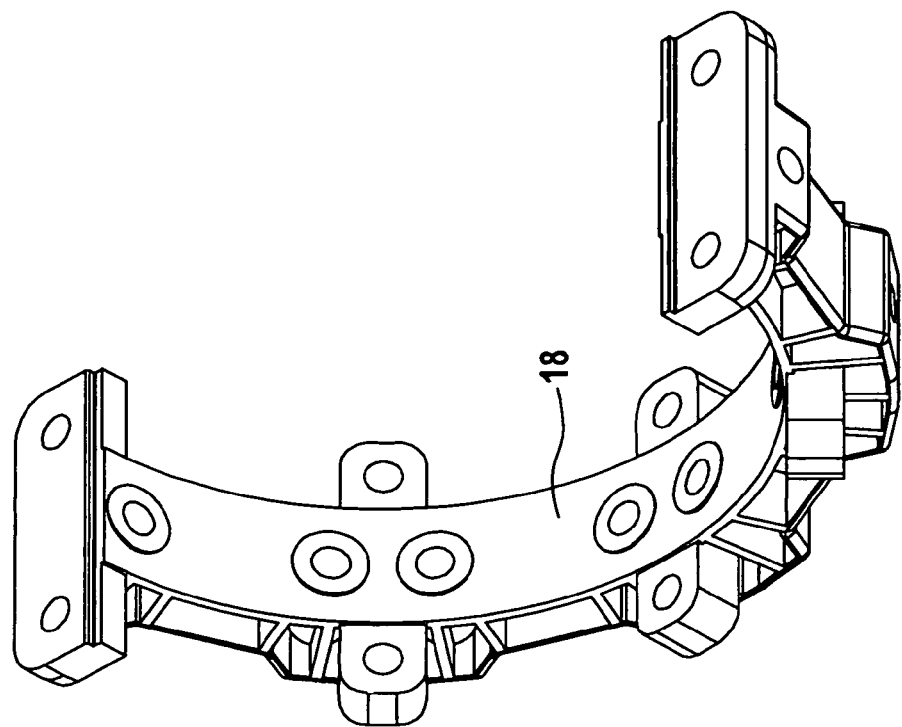
Figure 3B:
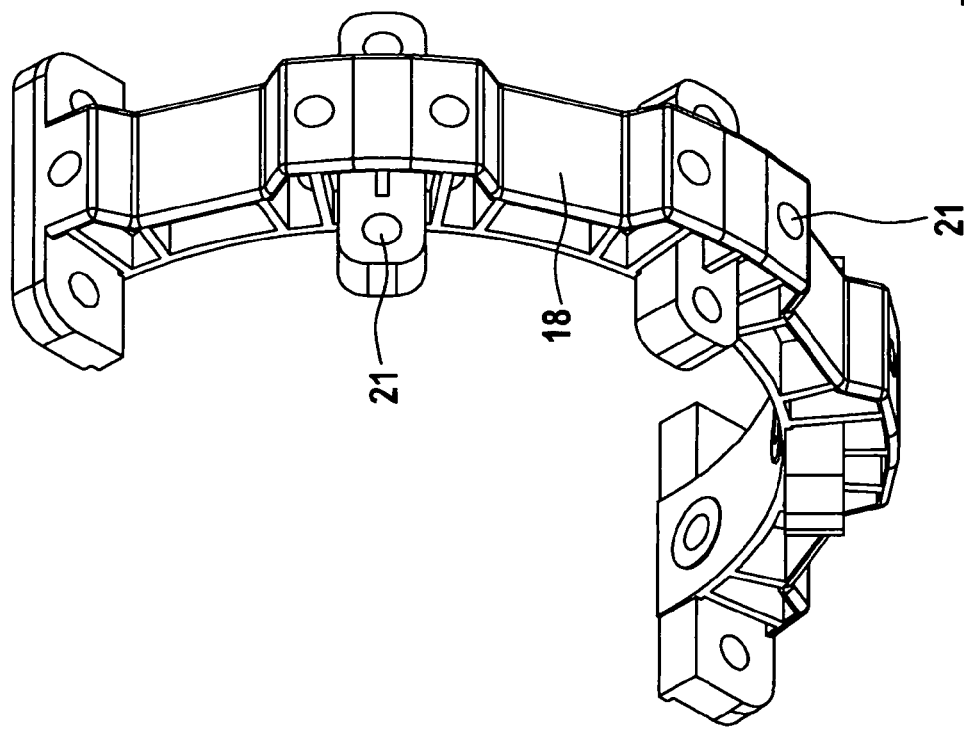
Figure 3C:
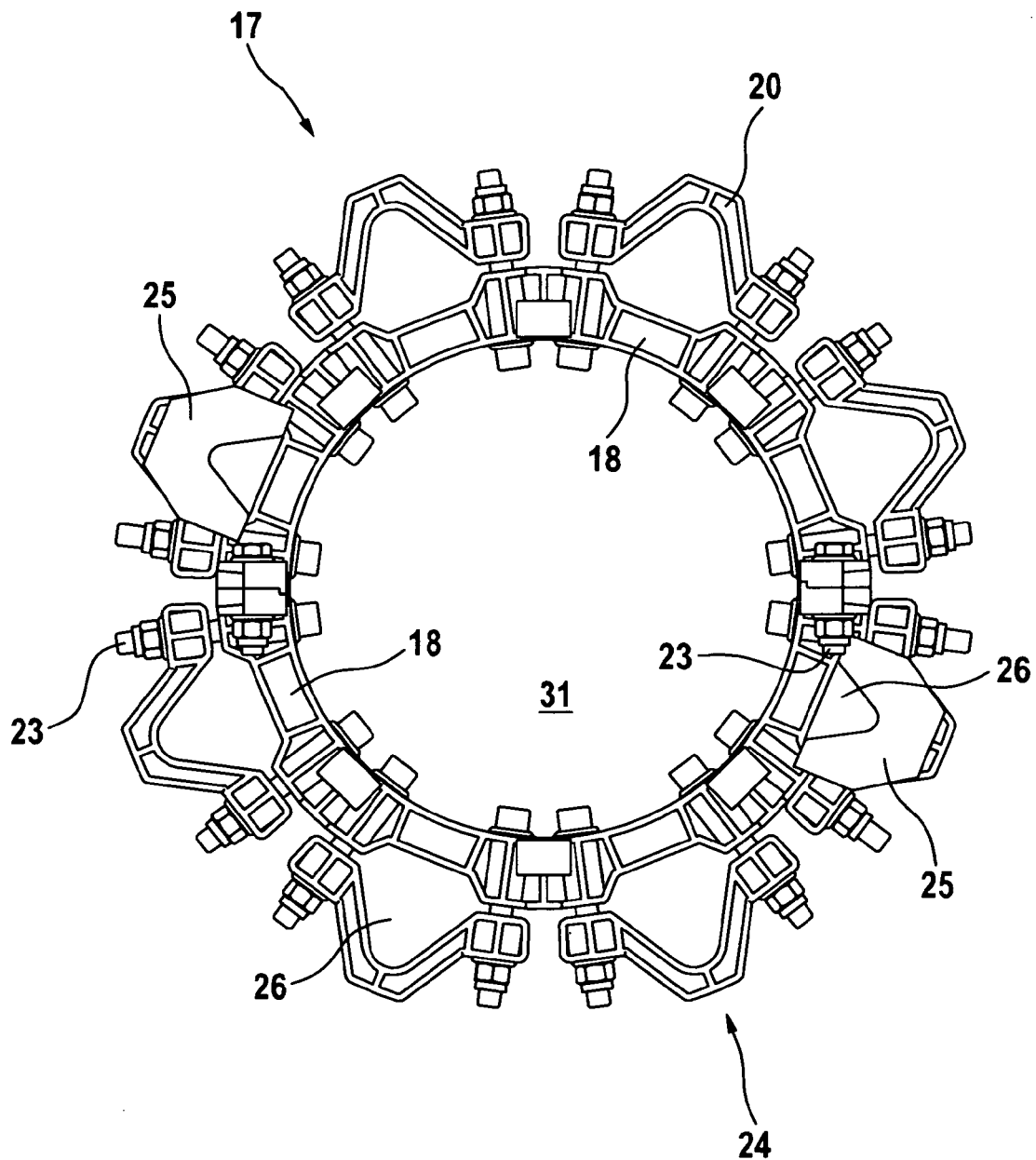
Figure 4:
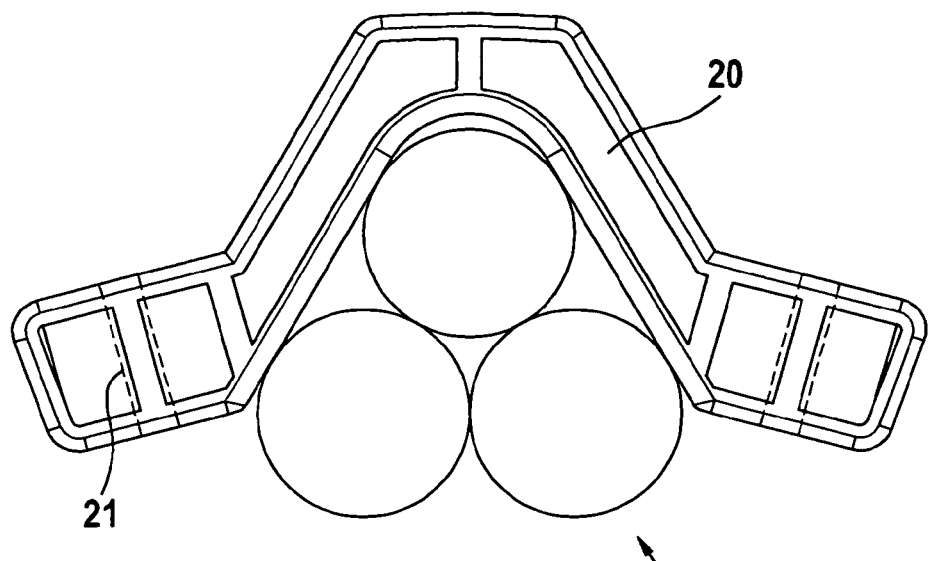
Figure 5:
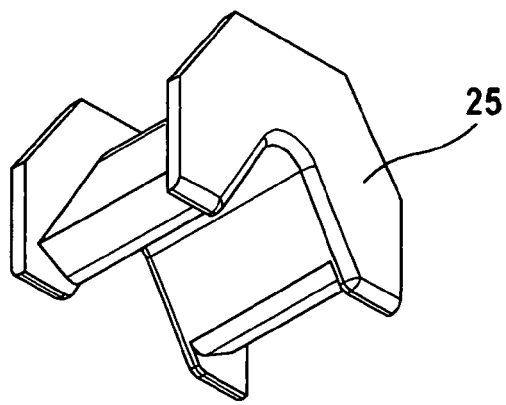
Figure 6A:
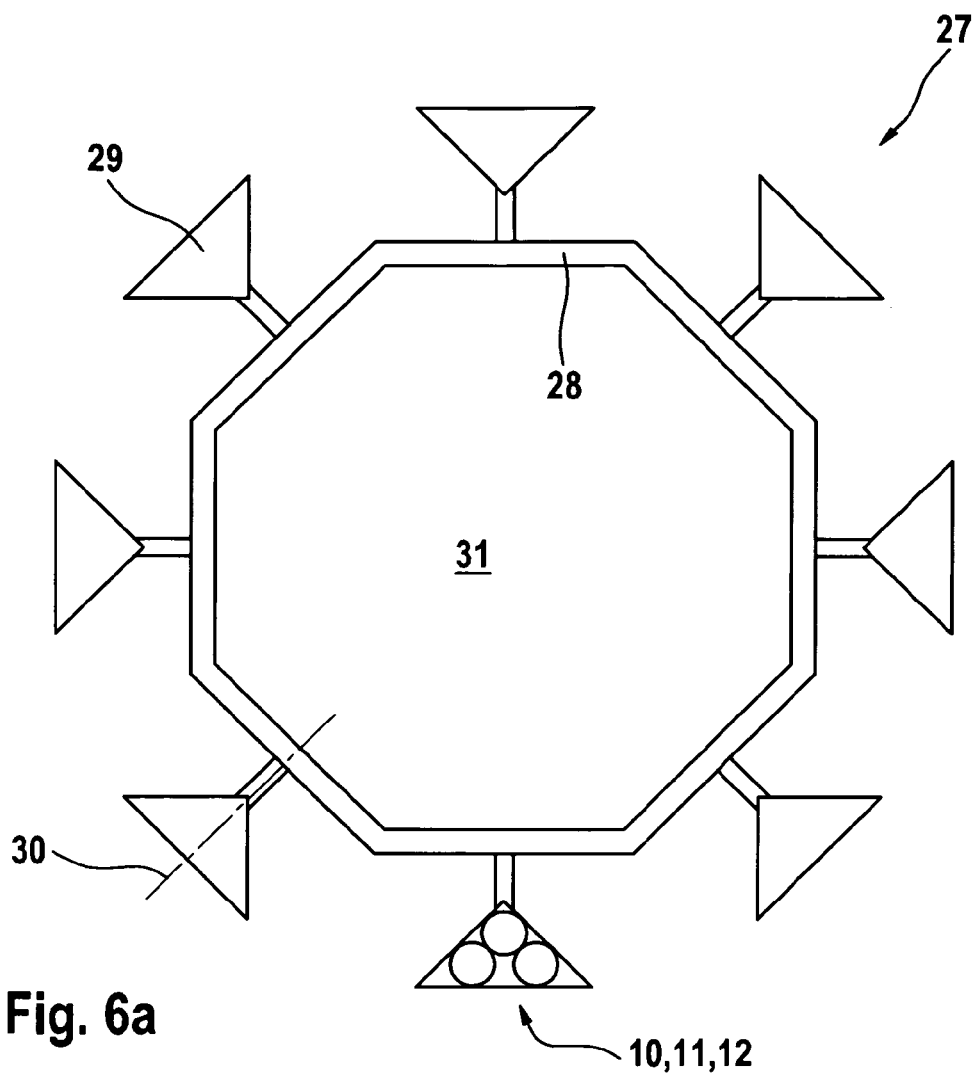
Figure 6B:
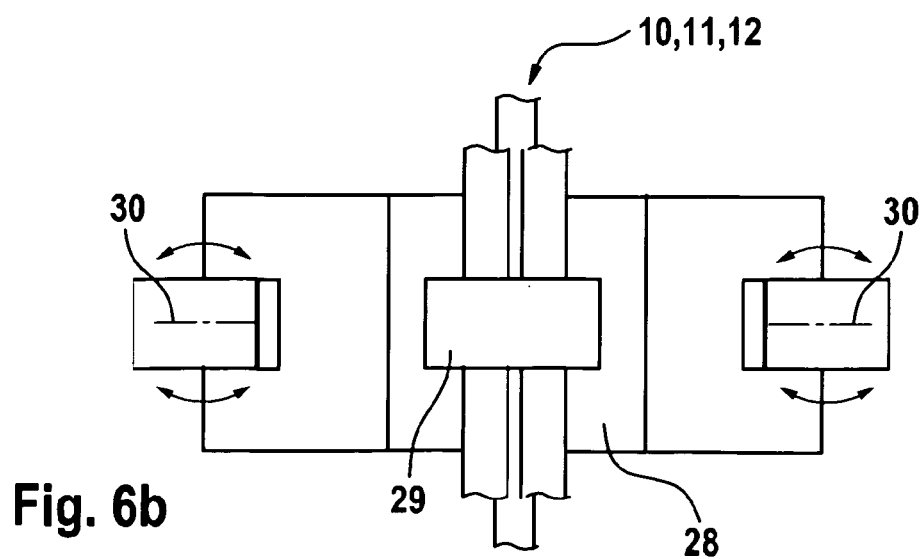
Figure 7:
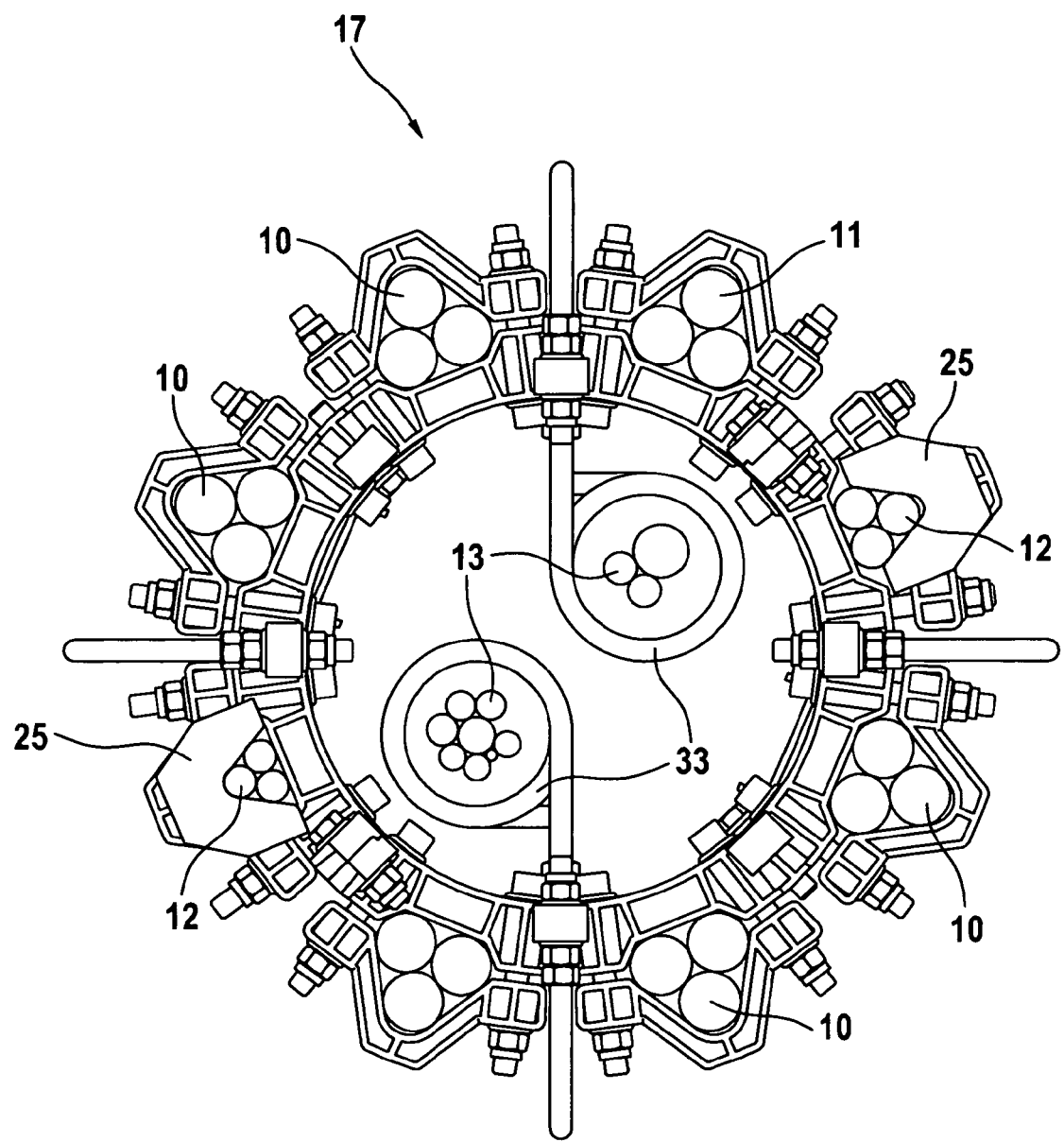

In the drawings:

FIG. 1 shows a wind turbine,
FIG. 2 shows an upper part of the tower of the wind turbine,
FIG. 3a shows a first embodiment of a bundling device,
FIG. 3b shows a carrier of the bundling device,
FIG. 3c shows a cross-section of the bundling device,
FIG. 4 shows a clamping clip of the bundling device,
FIG. 5 shows an insert of the clamping clip,
FIG. 6a shows an axial plan view of a second embodiment of the bundling device,
FIG. 6b shows a radial plan view of a second embodiment of the bundling device
FIG. 7 shows bundling device with loose guides
FIG. 8a shows bundling device with radial supports, and
FIG. 8b shows ring guide for the radial guidance of the cable bundle.

FIG. 1 shows a wind turbine 1 with a tower 2, a nacelle 8, which is rotatably mounted on the tower 2 about a tower axis 4 of the tower 2, and a rotor 9, which is connected to a generator located in the nacelle 8. During the wind tracking—also known as 'yawing'—the nacelle 8 is rotated about the tower axis 4 of the tower 2 in the horizontal plane in order to perpendicularly rotate the rotor 9 in the wind and consequently maximize the energy output. Since the wind direction varies during the operation of the wind turbine 1 or even rotates, it may be possible that the nacelle 8 is rotated around its own axis several times.

The statements used below about an axial direction 5, radial direction 6, and circumferential direction 7 and the statements about the top and bottom apply to the longitudinal axis of the erected tower 2 of the wind turbine 1.

FIG. 2 shows an upper part of the tower 2 of a wind turbine 1. In the tower 2 of the wind turbine 1, a plurality of current-conducting cables 10, 11, 12, 13 are guided from electrical components in the nacelle 8 to the ground. These current-conducting cables 10, 11, 12, 13 are, for example, cable 10 for electrically transmitting of three-phase alternating current (power cable 10), cable for ground conductor 11 and/or signal and control cable 12. The current-conducting cables 10, 11, 12, 13 are combined together to a cable bundle 14 in the upper part of the tower 2 through a plurality of bundling devices 17, 27. This cable bundle 14 is non-rotatably connected to the nacelle 8 at the upper end 15, which is rotatably mounted on the tower 2 and non-rotatably connected to the tower 2 at the lower region 16 of the cable bundle 14 but hangs essentially freely in the tower 2. In order to support a radial movement of the cable bundle 14, the tower 2 also comprises a plurality of ring guides 19 which are fixedly connected to the tower 2 and guided through the cable bundle 14.

FIGS. 3a and 3c show a bundling device 17 comprising a two-part carrier 18 and a plurality of clamping clips 20. The annular carrier 18 consists of two parts which are screwed together. The carrier 18 has a plurality of bores 21 in the radial direction 6 which are used to fasten the clamping clips 20. Furthermore, the carrier 18 also has bores 21 for securing, for example, radial supports 22. The individual parts of the carrier 18 are also shown in FIG. 3b. The clamping clips 20 are formed in a substantial V-shape and comprise two flanges with bores for attaching the clamping clips 20 to the carrier 18. The clamping clips 20 are non-rotatably connected to the carrier 18 by means of screws 23 and form a fastening device 24 for cables 10, 11, 12 together with the carrier 18. The fastening devices 24 are arranged so that they form an equilateral and polygonal structure. Through this structure the cables 10, 11, 12 mounted in the fastening devices 24 have a distance D with respect to each other at any time. Through the V-shape of the clamping clip 20 a receptacle 26 for cables 10, 11, 12 is formed between the carrier 18 and the clamping clip is 20. Through the substantially triangular cross-section of the receptacle 26, particularly three-phase cables 10, 12—each comprising three conductors 10a, 10b, 10c, each of which leads a phase—are held in an advantageous cloverleaf structure. The clamping clip 20 and the cloverleaf structure of the cables 10, 12 are also shown in FIG. 4. The fastening device 24 may also include an insert 25. Through the insert 25, the size of the receptacle 26 of the fastening device 24 is reduced so that cables 12 with a smaller cross-section can also be fastened. Such cables 12 may be three-phase cables of a rotor of a double-fed asynchronous generator. FIG. 5 shows the insert 25 in a removed state.

FIGS. 6a and 6b show a further embodiment of the bundling device 27. FIG. 6a shows the bundling device 27 based on an axial plan view and FIG. 6b based on a radial plan view. In this embodiment, the fastening devices 29 are each rotatably fixed about an axis 30 which extends in the radial direction 6 of the carrier 28. The fastening devices 29 alone form the receptacle 26 for the cables 10, 11, 12. Through the rotatable fixing, the fastening devices 29 can follow the rotation of the cables 10, 11, 12 into an oblique position of the cables 10, 11, 12 so that the longitudinal axes of the receptacle 26 of the fastening device 29 and cables 10, 11, 12 fastened therein remain parallel even during an oblique position of the cables 10, 11, 12. Thereby, the loads acting on the cables 10, 11, 12 and the fastening devices 29 are reduced.

The bundling device 17 shown in FIG. 7 includes a radially inner, circle-like cross-section 31. In accordance with a further embodiment, this cross-section 31 may be used to guide further cables 14, such as data, control, or signal cables. For this purpose, a further loose guide 33 is mounted on the carrier 18 of the bundling device 17, for example in the form of a round steel bar bent into a helix which is fixed in radial bores 21 of the carrier 18. In FIG. 7, the cloverleaf formation of the cables 10, 11, 12 which are fastened in the fastening devices 24 and the distance D of the cables 10, 11, 12 with respect to each other can also be seen.

In FIG. 8*a*, a cable bundle 14 with bundling devices 17 and radial support 22 is shown. In this embodiment, the radial supports 22 are formed as U-shaped rods which are respectively connected to two bundling devices 17 following one another in axial direction 5. The radial supports 22 are arranged to be in slidable connection with the ring guide 19 shown in FIG. 8*b* and connected to the tower 2. Through the radial support 22, it is prevented that the bundling devices 17 get stuck in a ring guide 19 during an axial movement.

The combinations of features disclosed in the embodiments should not act in a limiting way on the invention, furthermore the features of the different embodiments can be combined.

LIST OF REFERENCE SIGNS 1 wind turbine
2 tower
3 tower wall
4 tower axis
5 axial direction
6 radial direction
7 circumferential direction
8 nacelle
9 rotor
10 power cable
11 earth ing conductor
12 cable
13 signal and control cable
14 cable bundle
15 end
16 lower region
17 bundling device
18 carrier
19 ring guide
20 clamping clip
21 bore
22 support
23 screws
24 fastening device
25 insert
26 receptacle
27 bundling device
28 carrier
29 fastening device
30 axis
31 cross section
33 guide (helix)
D distance

The invention claimed is:

1. A tower for a wind turbine comprising,
an upper end, on which a nacelle is rotatably arranged,
wherein at least three cables are arranged longitudinally in the tower and form a cable bundle with a longitudinal axis,
and an upper end of the cable bundle is non-rotatably connectable to the nacelle,
and a lower region of the cable bundle is non-rotatably connected to the tower, wherein
at least two bundling devices comprising fastening devices for attachment of each bundling device to the at least three cables are provided,
wherein the bundling devices are arranged to the at least three cables between the upper end of the cable bundle and a lower portion of the cable bundle such that the at least three cables in the cable bundle have a minimum distance (D) with respect to each other, and
further wherein the fastening devices are rotatably arranged on a carrier such that an oblique position of the at least three cables with respect to the longitudinal axis of the cable bundle is automatically compensatable for by means of the fastening devices.

2. The tower according to claim 1, wherein a number of the fastening devices at least corresponds to a number of the at least three cables.

3. The tower according to claim 1, wherein the fastening devices are formed as clamping clips, that are fastened onto the carrier, wherein each clamping clip comprises a receptacle for a cable.

4. The tower according to claims 3, wherein the receptacle has a substantially triangular cross-section.

5. The tower according to claim 1, wherein each bundling device comprises at least three fastening devices.

6. The tower according to claim 3, wherein at least one fastening device comprises one insert, wherein a cross-section of the receptacle is reduced through the insert.

7. The tower according to claim 1, wherein ring guides are arranged in the tower, whereby a possibility of radial movement of the cable bundle is limited.

8. The tower according to claim 1, wherein the bundling devices have a distance with respect to each other, wherein the distance is chosen so that a free twist of the cables is admitted, and further wherein the cables are not twistable so that the bundling devices are in contact with each other.

9. The tower according to claim 8, wherein the bundling devices are arranged at a distance of 500-600 mm from each other.

10. The tower according to claim 7, wherein one or more of the bundling devices comprises a radial support, wherein the support is slidably locatable in a ring guide.

11. The tower according to claim 9, wherein the radial support is U-shaped and is connected to two bundling devices.

* * * * *